United States Patent [19]

Onokera

[11] Patent Number: 5,644,654
[45] Date of Patent: Jul. 1, 1997

[54] IMAGE PROCESSING APPARATUS CAPABLE OF EFFICIENT CODING OF COMPLEX SHAPE INFORMATION

[75] Inventor: Ken Onokera, Yokohama, Japan

[73] Assignee: Canon Kabushiki Kaisha, Tokyo, Japan

[21] Appl. No.: 387,627

[22] Filed: Feb. 13, 1995

Related U.S. Application Data

[63] Continuation-in-part of Ser. No. 90,629, Jul. 12, 1993, abandoned, which is a continuation of Ser. No. 811,913, Dec. 23, 1991, abandoned, which is a continuation of Ser. No. 449,149, Dec. 15, 1989, abandoned, which is a continuation of Ser. No. 176,272, Mar. 31, 1988, abandoned.

[30] Foreign Application Priority Data

Apr. 6, 1987 [JP] Japan ............................ 62-083007
Apr. 6, 1987 [JP] Japan ............................ 62-083008

[51] Int. Cl.$^6$ ............................................. G06K 9/48
[52] U.S. Cl. ............................................. 382/199
[58] Field of Search ....................... 345/144; 395/142, 395/143; 382/187, 199, 201, 203, 232

[56] References Cited

U.S. PATENT DOCUMENTS

| | | | |
|---|---|---|---|
| 4,542,412 | 9/1985 | Fuse et al. | 382/13 |
| 4,550,438 | 10/1985 | Convis et al. | 382/56 |
| 4,620,287 | 10/1986 | Yam | 340/728 |
| 4,653,107 | 3/1987 | Shojima et al. | 382/22 |
| 4,674,059 | 6/1987 | Schrieber | 364/523 |
| 4,686,632 | 8/1987 | Schrieber | 340/728 |
| 4,771,474 | 9/1988 | Takashima et al. | 382/23 |

FOREIGN PATENT DOCUMENTS

| | | | |
|---|---|---|---|
| 2147474 | 5/1985 | United Kingdom | H04N 1/411 |
| 8302179 | 6/1983 | WIPO | G06F 3/00 |

*Primary Examiner*—Jose L. Couso
*Attorney, Agent, or Firm*—Fitzpatrick, Cella, Harper & Scinto

[57] ABSTRACT

There is provided an image processing apparatus for approximating the contour of a character or the like by a set of function curves or straight lines, thereby compressing the image data by contour decision information. This apparatus comprises: a designating section to designate a curve portion of a contour line; a section to obtain slopes and coordinates of the curve portion at the initial and terminative points thereof or of each interval which is obtained by dividing the curve portion designated by the designating section; a section to determine a dividing point in the interval or on the curve portion; a section to obtain the coordinates of the dividing point; an approximating section to approximate the curve portion on the basis of the slopes of the curve portion and on the basis of the coordinates of the initial and terminative points and the dividing point; and a coder to encode the codes corresponding to the coordinates of a plurality of special points on the approximated curve into the coded data of the curve or interval. The approximating section performs the curve approximation by using a Bézier cubic curve and stores as the contour data of four special points on the Bézier cubic curve. Thus, the contour of image data can be approximated at a high speed and the image data can be easily compressed.

24 Claims, 11 Drawing Sheets ic
IMAGE PROCESSING APPARATUS CAPABLE OF EFFICIENT CODING OF COMPLEX SHAPE INFORMATION This application is a continuation of application Ser. No. 08/090,629, filed Jul. 12, 1993, now abandoned, which was a continuation of application Ser. No. 07/811,913, filed Dec. 23, 1991, now abandoned, which was a continuation of application Ser. No. 07/449,149, filed Dec. 15, 1989, now abandoned, which was a continuation of application Ser. No. 07/176,272, filed Mar. 31, 1988, now abandoned.

BACKGROUND OF THE INVENTION

1. Field of the Invention

The present invention relates to a compressing system of image data including characters and the like and, more particularly, to an image processing apparatus in which a contour of a character or the like is approximated by a set of functional curves or straight lines and the image data is compressed by the contour decision information.

2. Related Background Art

It is well known that an amount of dot data which is obtained by dividing image data of a character or the like into dots is extremely large. Therefore, in order to compress such a large quantity of data and then store or transmit the compressed data, various kinds of data compressing methods have been proposed. The shape of character or the like is detected as a contour and the contour decision information is stored, thereby compressing the data amount. For example, there are known: a straight line approximating method disclosed in Japanese Patent Laid-Open Applications Nos. 149522/1979 and 79154/1980; an n-degree curve approximating method disclosed in Japanese Patent Laid-open Nos. 39963/1982, 134745/1983, and 75976/1985; and the like.

However, according to the former straight line approximating method, smoothness of the contour is not assured. On the other hand, according to the latter n-degree curve approximating method, although smoothness of a curve is ensured, it is complicated to convert the functional equations to the curve, so that it takes a long time to generate the curve. Therefore, this method has the drawback that it cannot be practically used in a high speed display device such as CRT or laser beam printer in terms of the processing speed. To solve this drawback, there is known a method using a Bézier cubic curve which can generate a curve at a high speed. However, according to this method, since a method of forming an approximation to a given curve has not been established yet, there is a problem in that the approximation is difficult.

SUMMARY OF THE INVENTION

The present invention is made in consideration of the foregoing conventional methods and it is an object of the invention to provide an image processing apparatus in which a contour of image data of a character or the like is approximated and coded by a curve which can be generated at a high speed, thereby compressing the image data.

DETAILED DESCRIPTION OF THE PREFERRED EMBODIMENTS

A preferred embodiment of the present invention will be described in detail hereinbelow with reference to the drawings.

[Description of a functional block diagram (FIG. 1)]

Figure 1:
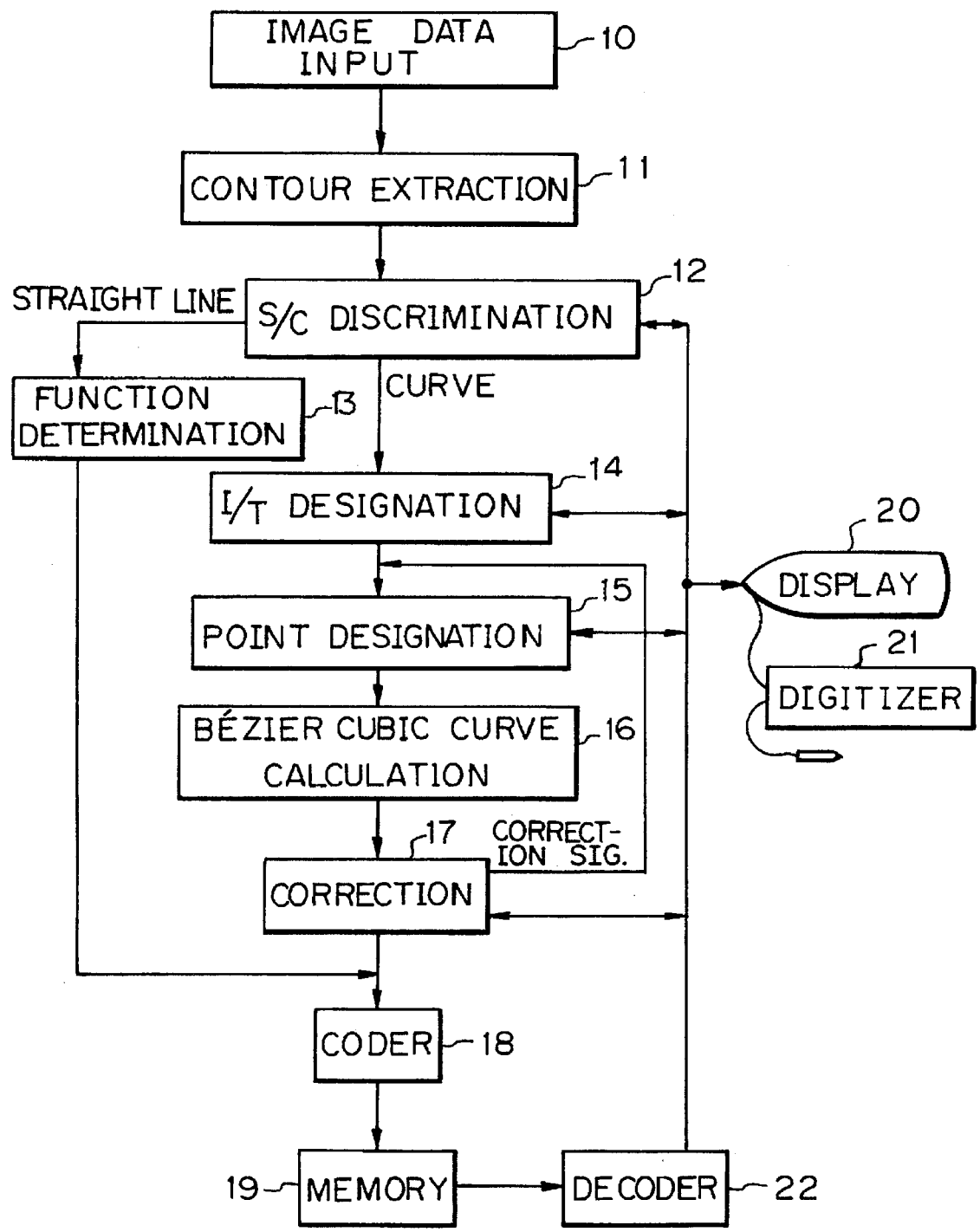
FIG. 1 is a functional block diagram of an embodiment of the invention.

FIG. 1 is a block diagram showing a functional arrangement of an embodiment.

In the diagram, reference numeral 10 denotes an image data input section to input image data which is dissolved into dots in a matrix form of [x, y]. For example, the image data input section 10 consists of an image scanner. A contour extraction section 11 extracts the contour of the image data of a character or the like which is input from the image data input section 10 and is dissolved into dots. The contour of the character or the like which is extracted by the contour extraction section 11 is displayed by a display 20 such as a CRT display or the like. In a straight line/curve portion discrimination section (hereinafter, simply referred to as an S/C discrimination section) 12, the operator dissolves the contour into straight line portions and curve portions by designating points on the contour displayed on the display 20 by using a digitizer 21, mouse, light pen, or the like.

The contour portion discriminated as a straight line is converted into a linear equation such as y=ax +b indicative of a straight line by a function determination section 13.

On the other hand, the initial point and terminative point of the contour portion discriminated as a curve are designated by the operator in an initial point/terminative point designation section (hereinafter, simply referred to as an I/T designation section) 14. The initial point and terminative point are designated in a manner similar to the above. Namely, the operator designates points on the contour line displayed on the display 20 by using a light pen, digitizer, or the like. Next, a predetermined number of contour points to divide the curve portion designated by the initial point and terminative point are obtained. The slope of the contour (curve portion) defined by both edge points (initial point and terminative point) is obtained from the average value of the slopes among the contour points and both edge points (initial point and terminative point).

In a point designation section 15, the operator designates one proper point between the initial and terminative points and selects by using the digitizer 21, light pen, or the like in a manner similar to the above.

A Bézier cubic curve calculation section 16 obtains the curve by the Bézier cubic curve on the basis of the initial point and terminative point and the points on the contour designated by the operator and displays the calculated curve by the display 20. The operator looks at the curve displayed on the display 20 and again designates proper points by a correction section 17 if correction is necessary. The sections from the contour extraction section 11 to the correction section 17 are constituted by a microprocessor.

If there is no need to correct in the correction section 17, the coordinates of four points used to obtain the curve by the Bézier curve are encoded by a coder 18. The initial point and terminative point of the straight line portion are encoded and stored as compression codes into a memory 19.

A decoder 22 decodes the compression codes encoded by the coder 18 and converts into the coordinates and straight line equations. On the basis of the coordinate data, the curve portions of the contour are obtained by the Bézier curve and the straight line portions of the contour are synthesized, thereby obtaining the contour of the original character or the like.

The data processing in the respective sections will be described in detail hereinbelow.

[Extraction of features of image data (FIGS. 2 to 4)]

The image data input section 10 inputs image data by the raster scan by using a scanner or the like and dissolved into dots in a matrix form of [x, y]. The resultant binary dot pattern data becomes the original image data to be processed.

Figure 2:
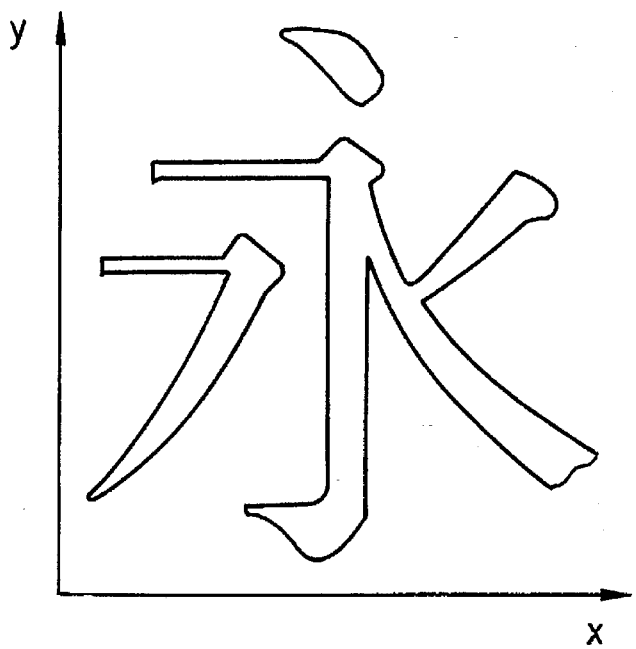
FIG. 2 is a diagram showing contour data of an input character " 永 "

The contour extraction section 11 extracts the dot position, as a contour point, corresponding to the change position from "0" to "1" or from "1" to "0" in the x or y direction of the binary dot pattern data. FIG. 2 shows the contour data of the resultant character 永 (,which is read "ei" and means "long time").

The operator discriminates the straight line portions and curve portions of the contour data as shown in, e.g., FIG. 2 which is displayed on the display 20, thereby designating the initial points and terminative points of the straight line portions by using the digitizer 21 or the like.

Figure 3:
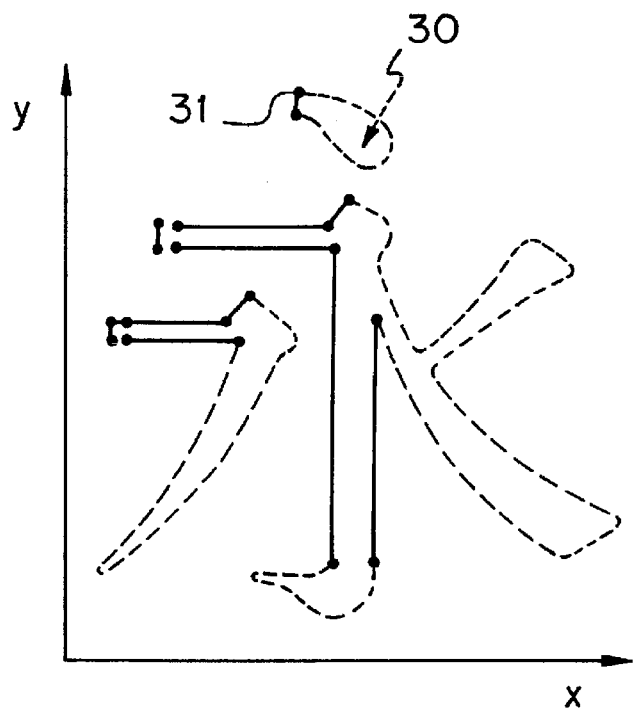
FIG. 3 is a diagram showing the case where the contour data of FIG. 2 is divided into straight line portions and curve portions.

FIG. 3 is a diagram showing the contour data discriminated in this manner. Each solid line portion is a portion discriminated as a straight line portion by the operator. Each broken line portion is a portion discriminated as a curve portion. Black dot portions at both ends of each straight line portion denote the points designated as being the initial point and terminative point. The straight line portions shown by the solid lines are converted into linear equations by the function determination section 13.

Figure 4:
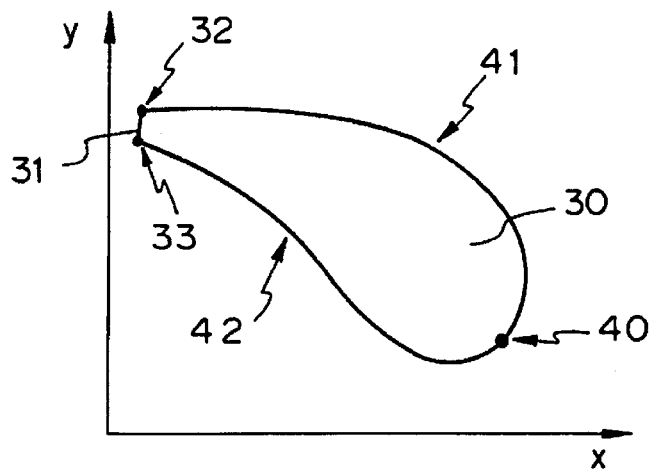
FIG. 4 is an enlarged diagram of a part of FIG. 3.

FIG. 4 is an enlarged diagram of a portion 30 in FIG. 3.

Reference numeral 31 denotes a straight line portion discriminated as a straight line, and 32 and 33 indicate an initial point and a termination or terminative point of the straight line portion 31, respectively. In the I/T designation section 14, when a dividing point 40 is input, a curve 41 whose initial point is set as point 32 and whose terminative point is set as point 40 and a curve 42 whose initial point is set as point 40, and whose terminative point is set as point 33, are determined.

[Calculation of the slopes on a curve (FIGS. 5 to 8)]

The slopes at the respective points on the curves designated as curve portions are subsequently calculated.

That is, a predetermined number of points before and after the points on the curve are extracted. The slopes of the line segments which are defined by connecting the points and the points before and after these points are respectively calculated, thereby calculating the slope of the curve at a predetermined point.

Figures 5, 6, 7:
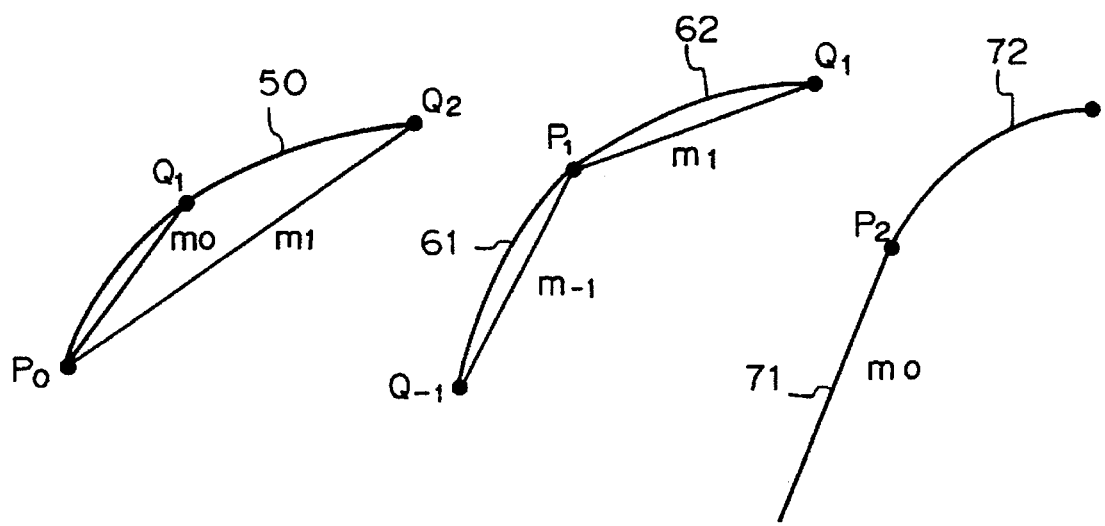
FIGS. 5 to 7 are diagrams showing methods of obtaining slopes on a curve, respectively.

FIG. 5 is a diagram showing the case of obtaining a slope $t_0$ at a point $P_0$ when the point $P_0$ is the initial point of a curve 50.

It is assumed that the points extracted on a contour to obtain a slope are $Q_1$ and $Q_2$, and the slope of the line segment $\overline{P_0Q_1}$ is $m_0$' and the slope of the line segment $\overline{P_0Q_2}$ is $m_1$. The slope $m_0$ of the line segment $\overline{P_0Q_1}$ is calculated by the following equation when it is assumed that the coordinates of the point $P_0$ are $(x_1, y_1)$ and the coordinates of the point $Q_1$ are $(x_2, y_2)$.

$$m_0 = \frac{y_2 - y_1}{x_2 - x_1}$$

Similarly, assuming that the coordinates of the point $Q_2$ are $(x_3, y_3)$, $$m_1 = \frac{y_3 - y_1}{x_3 - x_1}$$

When the slopes $m_0$ and $m_1$ of the respective line segments are obtained, the slope $t_0$ at the initial point $P_0$ can be calculated by the following equation.

$$t_0 = \tan\left(\frac{\tan^{-1}m_0 + \tan^{-1}m_1}{2}\right)$$

The terminative point can be also similarly derived.

FIG. 6 is a diagram showing the case of obtaining the slope $t_1$ of the curve at the connecting point $P_1$ (e.g., the point 40 in FIG. 4) of curves 61 and 62.

Points $Q_{-1}$ and $Q_1$ on the contours of the curves 61 and 62 are obtained. Then, the slope $m_{-1}$ of the line segment $\overline{Q_{-1}P_1}$ and the slope $m_1$ of the line segment $\overline{P_1Q_1}$ are also calculated. Thus, the slope $t_1$ can be obtained by the following equation:

$$t_1 = \tan\left(\frac{\tan^{-1}m_{-1} + \tan^{-1}m_1}{2}\right)$$

FIG. 7 is a diagram showing the case of obtaining a slope $t_2$ at an initial point $P_2$ of a curve 72 connected with a straight line 71. At this time, the slope $t_2$ is equal to the slope $m_0$ of the straight line 71 and $t_2 = m_0$.

Figure 8:
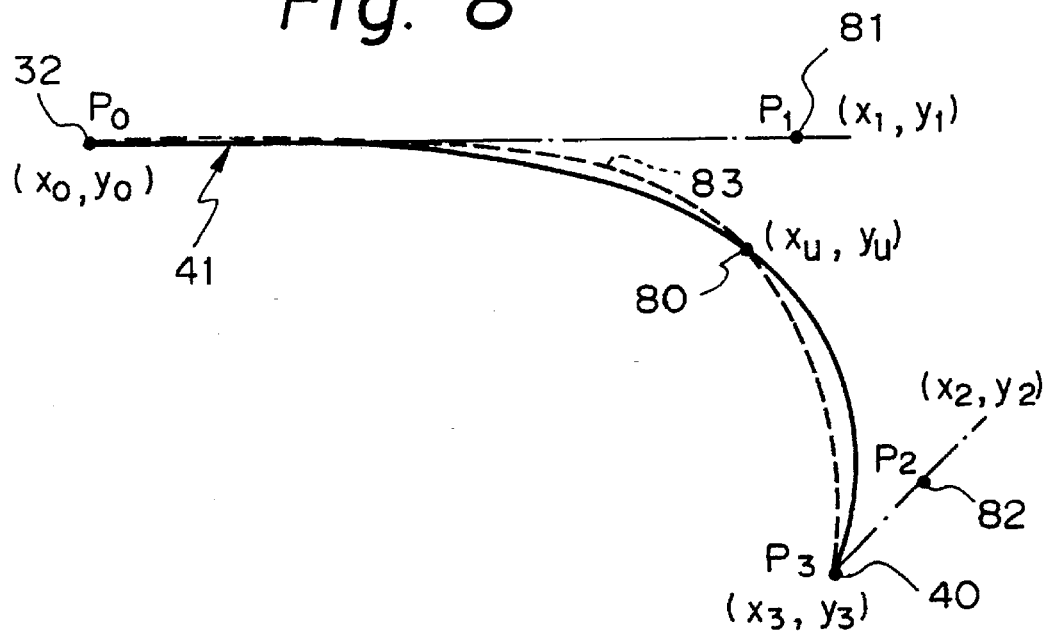
FIG. 8 is a diagram for explaining the case where a part of the curve of FIG. 4 is enlarged and approximated by a Bézier curve.

FIG. 8 is an enlarged diagram of the curve 41 in FIG. 4. In FIG. 8, the same portions as those shown in FIG. 4 are designated by the same reference numerals and symbols.

In FIG. 8, a point 80 is a point designated by the operator. The coordinates of the point 80 assume $(x_u, y_u)$. It is assumed that the coordinates of the initial point 32 of the curve 41 are $(x_0, y_0)$, the slope of the curve at the initial point 32 is $t_0$, the coordinates at the terminative point 40 are $(x_3,$ $y_3$), and the slope of the curve at the terminative point 40 is $t_3$. When the dividing value of the point 80 is 0.5, other two points 81 ($x_1$, $y_1$) and 82 ($x_2$, $y_2$) which define the Bézier curve are calculated by the following equations:

$$x_1 = \left\{ y_u - t_3 x_u - \frac{3}{4} y_0 + \frac{1}{8} (3t_0 + t_3)x_0 + \frac{1}{2} t_3 x_3 - \frac{1}{2} y_3 \right\} / \frac{3}{8} (t_0 - t_3)$$

$$y_1 = t_0(X_1 - X_0) + y_0$$

$$x_2 = \left\{ y_u - t_0 x_u - \frac{3}{4} y_0 + \frac{1}{8} (3t_3 + t_0)x_0 + \frac{1}{2} t_0 x_0 - \frac{1}{2} y_3 \right\} / \frac{3}{8} (t_0 - t_3)$$

$$y_2 = t_3(X_2 - X_3) + y_3$$

Now, with points
$P_0(x_0,y_0)$, $P_1(x_1,y_1)$, $P_2(x_2,y_2)$, $P_3(x_3,y_3)$,
the curve is expressed by $$P_{(t)} = P_0(1-t)^3 + 3P_1(1-t)^2 t + 3P_2(1-t)t^2 + P_3 t^3$$

where $0 \leq t \leq 1$.

The Bézier curve calculated in this manner is displayed on the display 20 as a broken curve 83 in FIG. 8.

The operator compares the calculated curve 83 with the original curve 41. If they are different, the point 80 is moved on the curve 41 and the calculation and display of the Bézier curve are repeated. The foregoing operations are repetitively executed until the curve 83 coincides with the curve 41.

[Description of the coding process (FIGS. 9 and 10)]

Figure 9A:
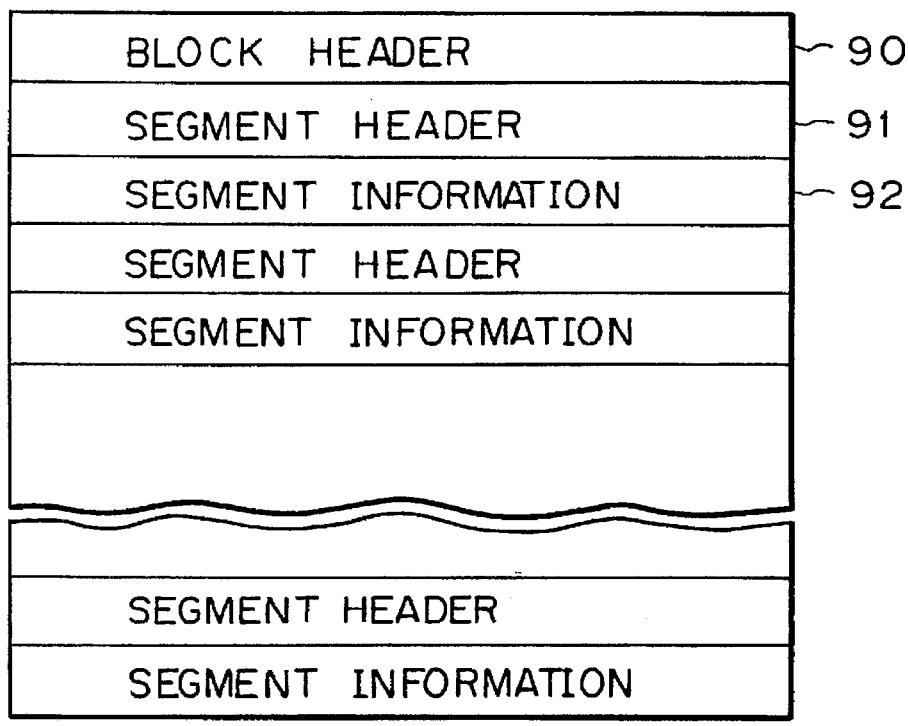
FIG. 9(A) is a diagram showing an example of a format of contour information.

FIG. 9(A) is a diagram showing an example of a format of the coded contour information.

In this example, as mentioned above, the coordinates of the initial point in each sample interval of the straight line portions and curve portions obtained, the coordinates of a special point on the approximated curve, and the coordinates of the terminative point are encoded. Further, the resultant code data are stored as a set of block data edited on each block unit basis. Thus, the compression data which corresponds to the contour of the image data of an arbitrary character or the like with high fidelity can be derived.

A block header 90 denotes an area to store the number of samples in one block. A segment header 91 includes a flag to distinguish a straight line or a Bézier curve and a flag indicative of the initial and terminative points of a line segment or curve. Segment information 92 stores the coded data of the x and y coordinates values of the initial and terminative points and of each special point.

Figure 9B:
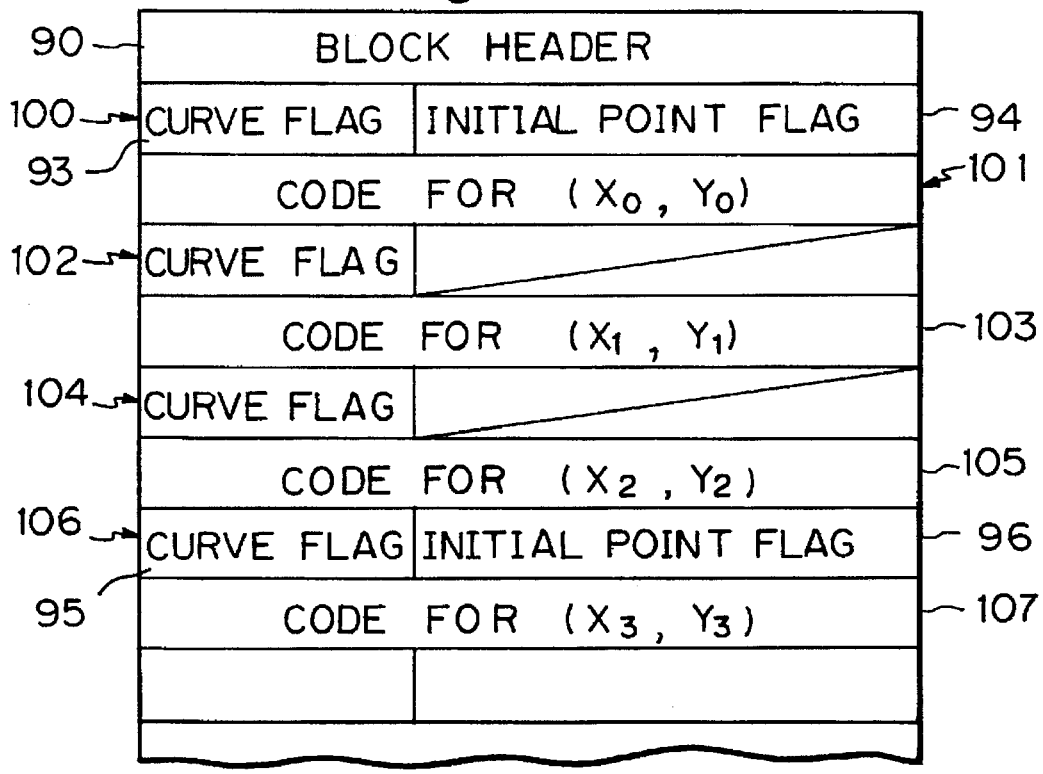
FIG. 9(B) is a diagram showing an example of contour information of a curve in FIG. 8.

FIG. 9(B) shows the case where the curve 41 in FIG. 8 is coded and recorded.

The curve 41 is a part of the portion shown at 30 in the character " 氷 " in FIG. 3. The number of samples in the portion 30 is set into the block header 90. The flag indicative of the initial point 32 of the curve 41 is set into a segment header 100. That is, a curve flag F 93 and an initial point flag F 94 are set to ON. The coded data of the coordinates ($x_0$, $y_0$) of the initial point 32 are stored into segment information 101. The coordinates of the special points 81 and 82 on the curve 41 are stored into segment information 103 and 105, respectively. In corresponding segment headers 102 and 104, only the curve flags are set to ON. Since the terminative point 40 of the curve 41 is also the initial point of the next curve 42, the curve flag and initial point flag in a segment header 106 are set to ON. The coded data of the coordinates ($x_3$, $y_3$) are stored into segment information 107.

Figure 10:
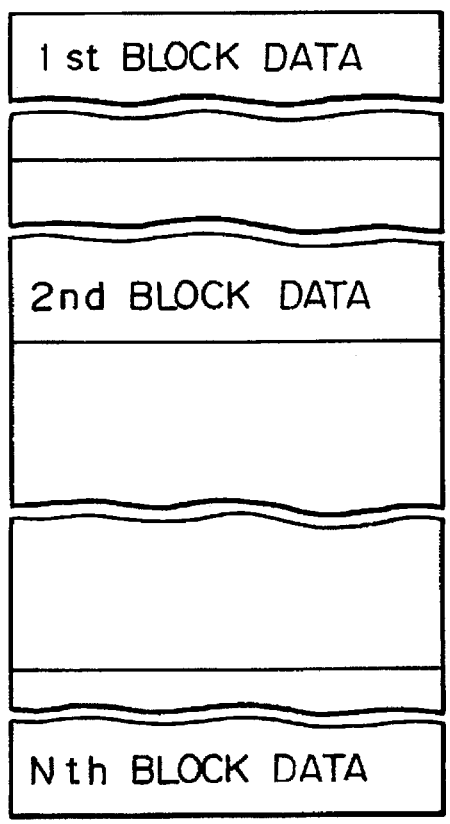
FIG. 10 is a diagram showing a format of block data.

Each of the coded block data based on the foregoing format is stored on each block unit basis as shown in FIG. 10.

The case regarding the compression of character contour data has been described above. The case of decoding the compressed contour data into the original contour data will now be explained hereinbelow.

For the compression data stored as shown in FIG. 10, the segment header and segment information are read every block data. A straight line in which the straight line flag in the segment header is set to ON is reproduced by connecting the compound initial and terminative points by a straight line. On the other hand, a curve in which the curve flag in the segment header is set to ON is obtained by the following equation $$P(t) = P_0(1-t)^3 + 3P_1 t(1-t)^2 + 3P_2 t^2(1-t) + P_3 t^3$$

(where $0 \leq t \leq 1$)

by using the foregoing Bézier curve on the basis of the coordinates of four special points which have been decoded. In this case, a curve can be expressed by sufficiently finely dissolving "t" between "0" and "1" and by drawing straight lines in the respective intervals.

The reconstructed contour data is developed by the dot pattern in the memory of the image data and supplied to an output device such as laser beam printer, CRT, or the like, so that a desired character or image is reconstructed.

In the embodiment, to correct an arbitrary point which is input, a method whereby this point is moved on an original curve has been used. However, the correction can be also performed by fixing an arbitrary point which is input and by changing a resolving coefficient u in a range from "0" to "1".

As explained above, according to the embodiment, there is the advantage that the coding process of a contour line by a Bézier curve, which has conventionally been considered to be difficult, can be accurately performed at a high speed by designating initial and terminative points and the other points on the contour line.

As described above, according to the invention, there are advantages such that the contour of the image data can be easily coded and reproduced (decoded) at a high speed.

[Another embodiment]

Another preferred embodiment of the invention will now be described in detail hereinbelow with reference to the drawings.

[Description of the functional block diagram (FIG. 11)]

Figure 11:
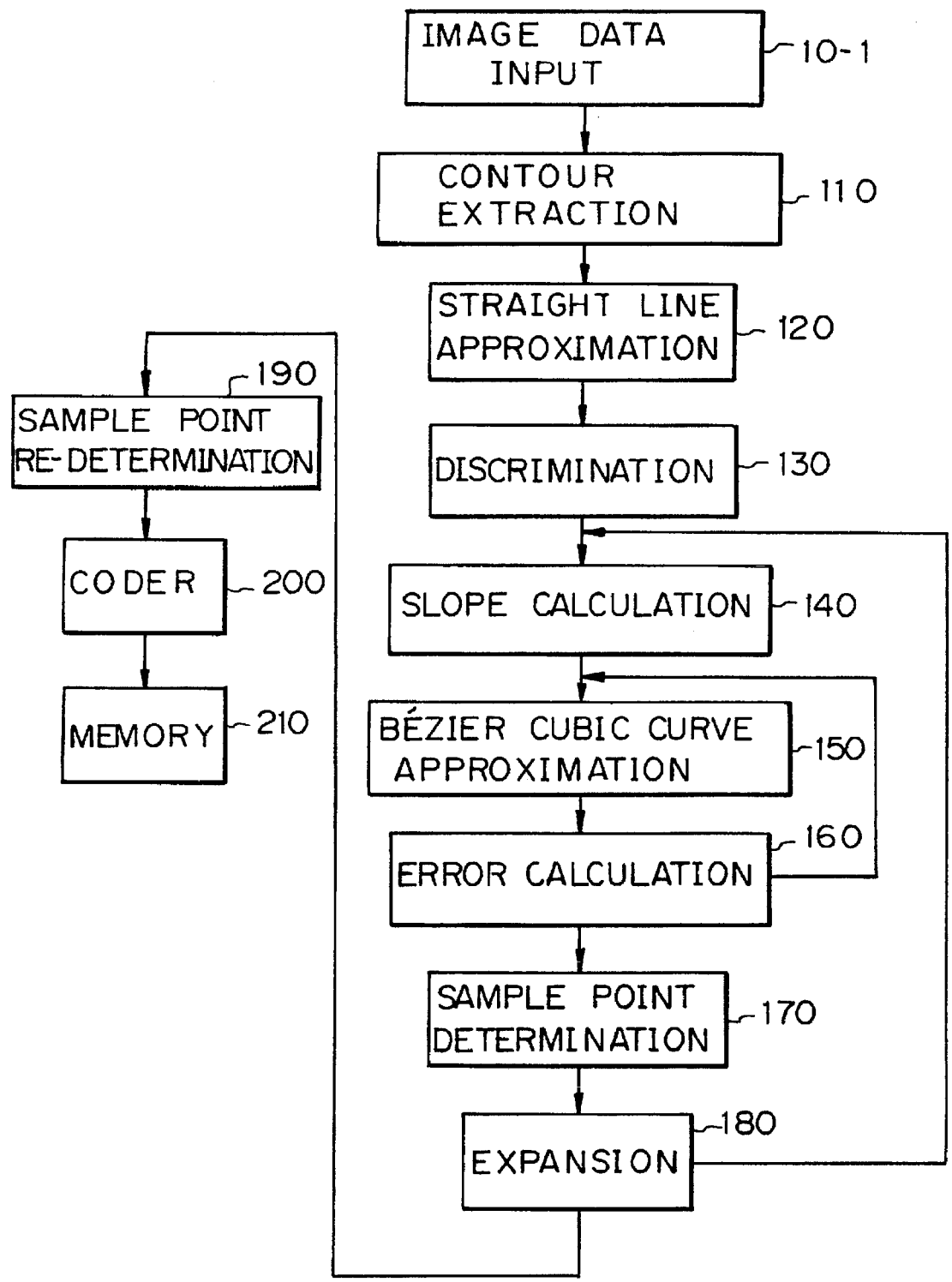
FIG. 11 is a functional block diagram of another embodiment.

FIG. 11 is a block diagram showing a functional arrangement of this embodiment.

In the diagram, reference numeral 101 denotes an image data input section to input image data which is dissolved into dots in a matrix form of [x, y]. The image data input section 101 consists of, e.g., an image scanner. A contour extracting section 110 extracts the contour of the image data of a character or the like which was input from the image data input section 101 and dissolved into the dots. In a straight line approximation section 120, the contour of a character or the like extracted by the contour extraction section 110 is approximated by straight lines by use of vectors such that deviation amounts from the contour are an allowable difference or less.

The approximation contour is divided into straight line portions and curve portions on the basis of the lengths of the vectors by a discrimination section 130. For the contour section discriminated as a curve, the slope of the contour (curve portion) at both edge points (initial point and terminative point) of the contour portion is calculated by a slope calculation section 140 on the basis of the average value of the slopes of the line segments connecting both edge points (initial point and terminative point) of the curve portion with a predetermined number of contour points which are set before and after both edge points and on the basis of the slope of a curve or straight line which is connected.

A Bézier cubic curve approximation section 150 sets a special dividing point P(u) on the Bezier cubic curve between the initial and terminative points on the contour line discriminated as a curve portion, thereby obtaining the Bézier cubic curve. An error calculation section 160 calculates a deviation difference between the contour point and the approximated Bézier cubic curve. The dividing point P(u) on the approximated portion of the Bézier cubic curve is moved on the contour so as to minimize this deviation difference.

When the Bézier cubic curve such as to minimize the difference is determined by the error calculation section 160, the dividing point P(u) is determined as a sample point by a sample point determination section 170.

In an expansion section 180, a terminative point ($P_3$) of the curve approximated by the curve approximation section 150 is checked. If the terminative point ($P_3$) is continuously connected to the next adjacent unknown curve, the process is advanced to the initial point of this unknown curve and the curve approximating processes from the slope calculation section 140 to the sample point determination section 170 are again executed. In a sample point re-determination section 190, a point such that the deviation difference between the approximated curve and the contour points of the original curve falls within a predetermined value and at the same time, the longest Bézier curve is obtained is determined to be the terminative point ($P_3$). The dividing point (sample point) at this time is also again decided. The sections from the contour extraction section 110 to the sample point re-determination section 190 are constituted by a microprocessor or the like.

When the deviation difference exceeds the predetermined range, the sample point is returned to the preceding sample point. When the terminative point of the curve portion is connected to the curve portion or straight line portion which has already been known, the expanding operation by the expansion section 180 is finished.

A coder 200 encodes the coordinates values of the points $P_0$ to $P_3$ to define the Bézier curve obtained as mentioned above. The coded compression data is stored into a memory 210.

By performing the foregoing processes for all of the contour portions, the compression codes obtained by dividing the contour data into the straight line portions and curve portions and then encoding them are formed in the memory 210.

In the decoder, the compression codes encoded by the coder 200 are decoded and converted into the coordinates and straight line equations. On the basis of the coordinates data, the curve portions of the contour are obtained by the Bézier curve and the straight line portions of the contour are synthesized, thereby deriving the contour of the original character or the like.

The data processes in the respective sections will now be explained in detail hereinbelow.

[Extraction of features of the image data]

The image data input section 10-1 inputs image data by the raster scan by using an image scanner or the like and dissolves the image data into dots in a matrix form of [x, y]. The resultant binary dot pattern data becomes the original image data to be processed.

The contour extraction section 110 extracts the dot position, as a contour point, corresponding to the change position from "0" to "1" or from "1" to "0" in the x or y direction of the binary dot pattern data.

[Description of the straight line approximation section and discrimination section (FIG. 12)]

In an arbitrary interval on a contour, the straight line approximation is performed by a plurality of vectors which are set to values as long as possible within a range in which the deviation amount from the original contour is a predetermined allowable difference or less.

Figure 12:
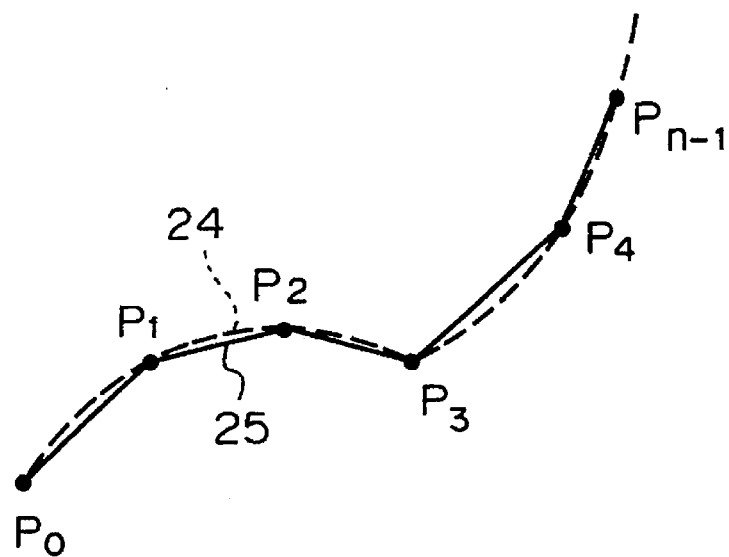
FIG. 12 is a diagram showing an example in which the curve portion is approximated by vectors.

FIG. 12 shows an example in the case where a contour 24 shown by a broken line was approximated into a straight line by a set of two-dimensional vectors 25 in an arbitrary interval ($P_0$, $P_{n-1}$) on the contour.

The contour shape of a character which is used in this embodiment generally has straight line portions and curve portions. To discriminate them, the straight line portion and curve portion are recognized on the basis of the lengths of vectors derived by the foregoing straight line approximation. That is, assuming that both ends of a certain approximation straight line are $P_i(x_i, y_i)$ and $P_{i+1}(x_{i+1}, y_{i+1})$, the length l of this vector is calculated as follows.

$$l = \sqrt{(x_i - x_{i+1})^2 + (y_i - y_{i+1})^2}$$

The line in which the length l is a predetermined value or less is recognized as a curve portion.

[Description of the slope calculation section (FIGS. 13 to 17)]

To approximate the curve portion derived by the discrimination section 130 by a Bézier cubic curve, the slopes at both edge points (initial point and terminative point) of the curve portion are necessary.

Figure 13:
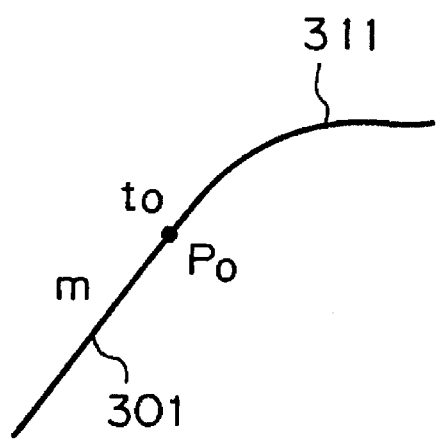
FIGS. 13 to 17 are diagrams showing methods of obtaining slopes on a curve, respectively.

FIG. 13 is a diagram showing the case where the curve 311 is continuously smoothly connected to the straight line 301. At this time, the slope m of the straight line 301 becomes the slope $t_0$ at the initial point ($P_0$) of the curve 311. That is, $t_0 = m$.

Figure 14:
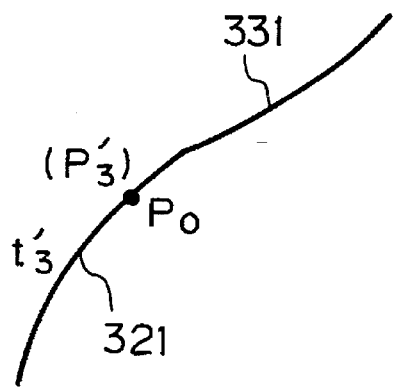
Figure 15:
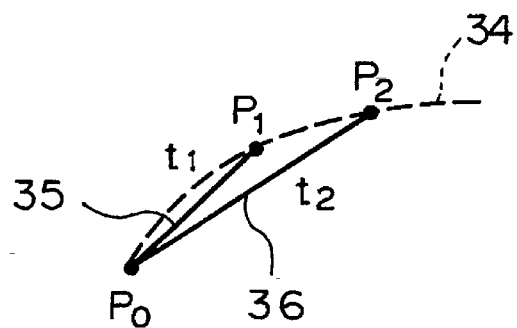

In FIG. 14, when a curve 331 which is smoothly (linearly) connected to a curve 321 which has already been approximated by a Bézier curve starts, a slope $t_3'$ at a terminative point $P_3'$ of the curve 321 becomes the slope $t_0$ at the initial point ($P_0$) of the curve 331. Namely, $t_0 = t_3'$.

In this case, predetermined contour points ($P_1$, $P_2$) are set on a curve 34 after the edge point ($P_0$). The average slope is calculated from the slopes $t_1$ and $t_2$ of line segments 35 and 36 connecting the edge point ($P_0$) and the contour points ($P_1$, $P_2$) (refer to FIG. 15 for the case of two contour points):

$$t_0 = \tan\left(\frac{\tan^{-1}t_1 + \tan^{-1}t_2}{2}\right)$$

Figure 16:
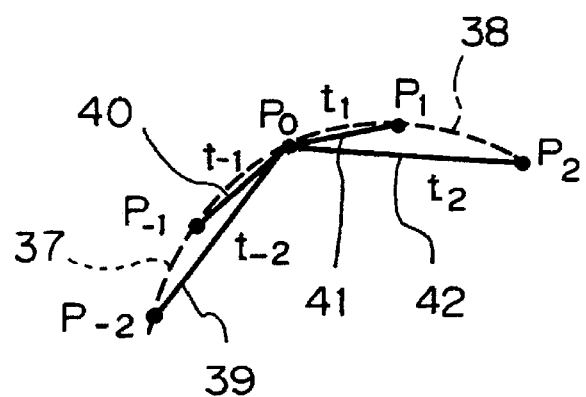

FIG. 16 is a diagram showing the case where the edge point ($P_0$) is set as an intermediate point between unknown curves 37 and 38 and the initial point or terminative point of the curve 38 is set.

In the case of FIG. 16, a predetermined number of contour points ($P_{-1}$, $P_{-2}$, $P_1$, $P_2$) are set on the unknown curves 37 and 38 before and after the initial point ($P_0$), and the slope $t_0$ at the initial point is obtained from the average value of the slopes of line segments 39 to 42 connecting the initial point ($P_0$) and each contour point. Therefore, in FIG. 16, the slope $t_0$ at the edge point $P_0$ is expressed by $$t_0 = \left( \frac{\tan^{-1}t_{-2} + \tan^{-1}t_{-1} + \tan^{-1}t_1 + \tan^{-1}t_2}{4} \right)$$

Figure 17:
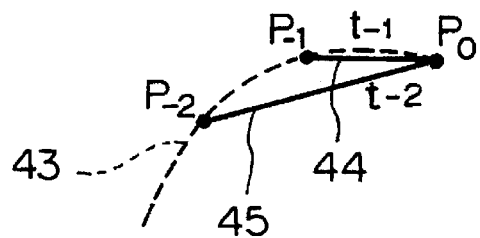

FIG. 17 is a diagram showing the case of obtaining the slope $t_0$ at the terminative point when the terminative point ($P_0$) of a curve portion 43 is not smoothly connected to any line.

In this case, predetermined contour points ($P_{-1}$, $P_{-2}$) are set on the curve 43 before the terminative point $P_0$ and the slope $t_0$ at the edge point $P_0$ is obtained from the average value of the slopes $t_{-1}$ and $t_{-2}$ of the line segments 44 and 45 connecting the edge point $P_0$ and the contour points $P_{-1}$ and $P_{-2}$. Therefore, $$t_0 = \tan\left( \frac{\tan^{-1}t_1 + \tan^{-1}t_2}{2} \right)$$

[Description of the Bézier cubic curve approximation portion (FIG. 18)]

Figure 18:
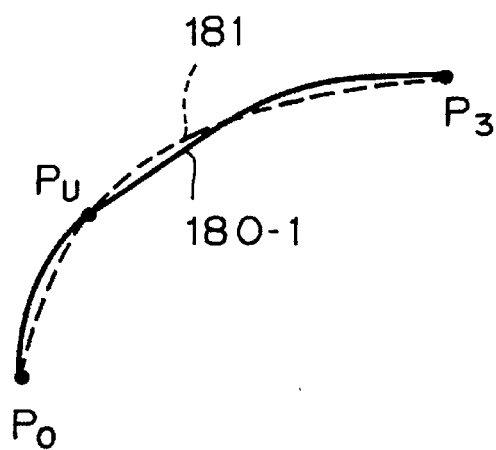
FIG. 18 is a diagram showing a method of approximating a curve by a Bézier curve.

FIG. 18 is a diagram showing a curve 181 which is obtained by approximating a contour line 180-1 discriminated as a curve. Both edge portions of the contour line 180-1 are set to $P_0(x_0, y_0)$ and $P_3(x_3, y_3)$ and the slopes of the curves at these edge points are set to $t_0$ and $t_3$. Next, the contour point adjacent to the point $P_0$ on the contour line 180-1 between $P_0$ and $P_3$ is set to $P_u(X_u, Y_u)$ and u=0.5. In this case, the other two points $P_1(x_1, y_1)$ and $P_2(x_2, y_2)$ which define the Bézier curve are calculated by the following equations, respectively.

$$x_1 = \left\{ y_u - t_3 x_u - \frac{3}{4} y_0 + \frac{1}{8} (3t_0 + t_3)x_0 + \frac{1}{2} t_3 x_3 - \frac{1}{2} y_3 \right\} / \frac{3}{8} (t_0 - t_3)$$

$$y_1 = t_0(x_1 - x_0) + y_0$$

$$x_2 = \left\{ y_u - t_0 x_u - \frac{3}{4} y_0 + \frac{1}{8} (3t_3 + t_0)x_0 + \frac{1}{2} t_0 x_0 - \frac{1}{2} y_3 \right\} / \frac{3}{8} (t_0 - t_3)$$

$$y_2 = t_3(x_2 - x_3) + y_3$$

This Bézier curve becomes $$P_{(t)} = P_0(1-t)^3 + 3P_1(1-t)^2 t + 3P_2(1-t)t^2 + P_3 t^3$$

(where, $0 \leq t \leq 1$)

[Description of the error calculation section and sample point determination section]

The deviation between the Bézier curve derived as explained above and the original contour (curve portion) is obtained.

This deviation is obtained by the following method. In the foregoing Bézier curve, t is set to an enough small value within a range from 0 to 1. The minimum value of the distances between each point on the Bézier curve which is obtained in correspondence to the value of each t and the contour points is set to the deviation between the Bézier curve and each contour point. These processes are executed with respect to all of the contour points including the edge point between $P_0$ and $P_3$. The maximum value of the deviations obtained is set to the difference from the original contour.

The dividing point $P_u$ is moved on the contour line between $P_0$ to $P_3$ so as to minimize this difference. The Bézier curve approximation and the calculation of the difference are repeated.

The points $P_0$ to $P_3$ when the difference is the minimum are set to the temporary sample points. This is because when an unknown curve is subsequently connected, there is a possibility such that the sample point changes as will be explained hereinlater.

[Description of the expansion section (FIG. 19)]

Figure 19:
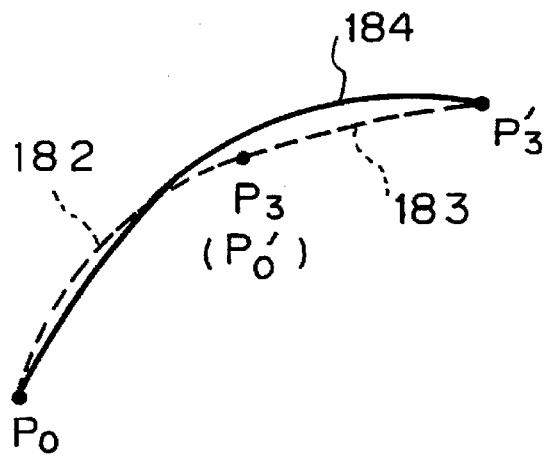
FIG. 19 is a diagram for explaining an expanding process of a curve.

FIG. 19 is a diagram showing the expanding process of a curve portion (that is, the process to connect the curve portion which has already been derived with an unknown curve portion) when an unknown curve portion is connected adjacently to the contour line derived.

A curve 182 shown by a broken line is a curve portion which has already been obtained and its terminative point is set to $P_3$. A curve portion 183 is an unknown curve portion. The point $P_3$ is moved to a terminative point $P_3'$ of the curve portion 183, thereby obtaining a Bézier curve 184 by the Bézier cubic curve approximation section 150. When the difference between the Bézier curve 184 and the curve 183 obtained in this manner falls within a predetermined difference range, the expanding operation is further continued, thereby expanding the curve portion, namely, connecting with the next curve interval.

When the difference exceeds the predetermined difference range, the expanding process is finished and the sample point is returned to the preceding sample point. On the other hand, when the curve portion or straight line portion which has already been known subsequently continues, the expanding process is also finished.

In the sample point re-determination section 190, four points ($P_0$ to $P_3$) on the Bézier curve which is obtained as mentioned above are newly determined as sample points.

[Description of the coder (FIGS. 20 and 21)]

The coordinates of the sample points of the straight line portions and curve portions derived as explained above are encoded. Further, the coded data is stored as a set of block data edited on each block unit basis. Thus, the compression data according to the contour of an arbitrary character can be obtained with high fidelity.

Figure 20A:
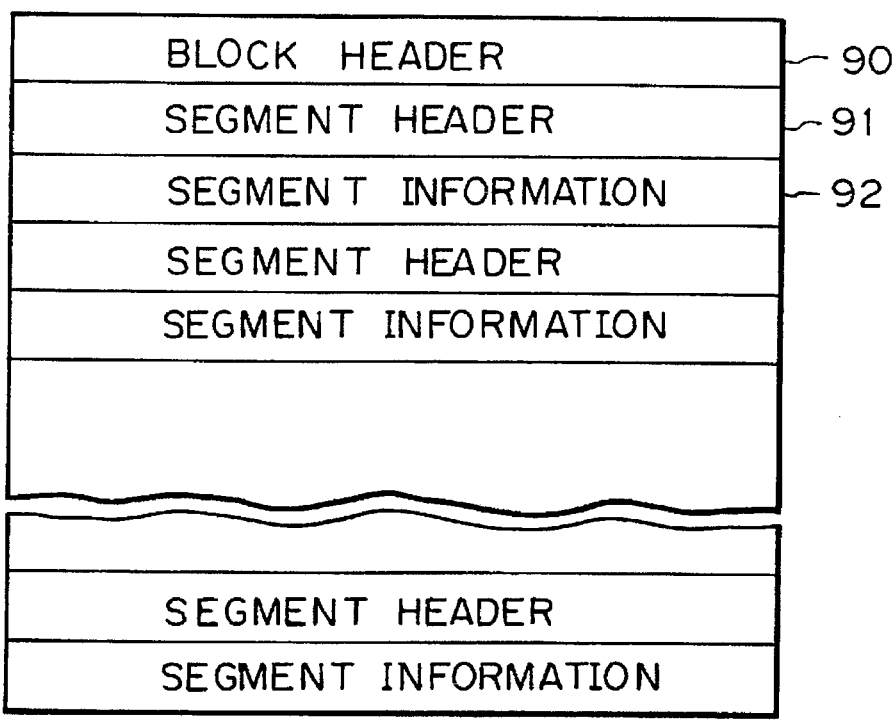
FIG. 20(A) is a diagram showing an example of a format of contour information.

FIG. 20(A) is a diagram showing an example of a format of coded contour information.

The coordinates of the initial point in each sample interval of the resultant straight line portions and curve portions, the coordinates of special points of approximation curves, and the coordinates of the terminative points are encoded. Further, the coded data is stored as a set of block data edited on each block unit basis. Thus, the compression data according to the contour of the image data of an arbitrary character or the like can be derived with high fidelity.

The block header 90 denotes the area to store the number of sample points in one block. The segment header 91 includes the flag to distinguish a straight line or Bézier curve and the flag to indicate the initial point and terminative point of a line segment or curve. The coded data of the values of the x and y coordinates of the initial point, terminative point, and each special point are stored in the segment information 92.

Figure 20B:
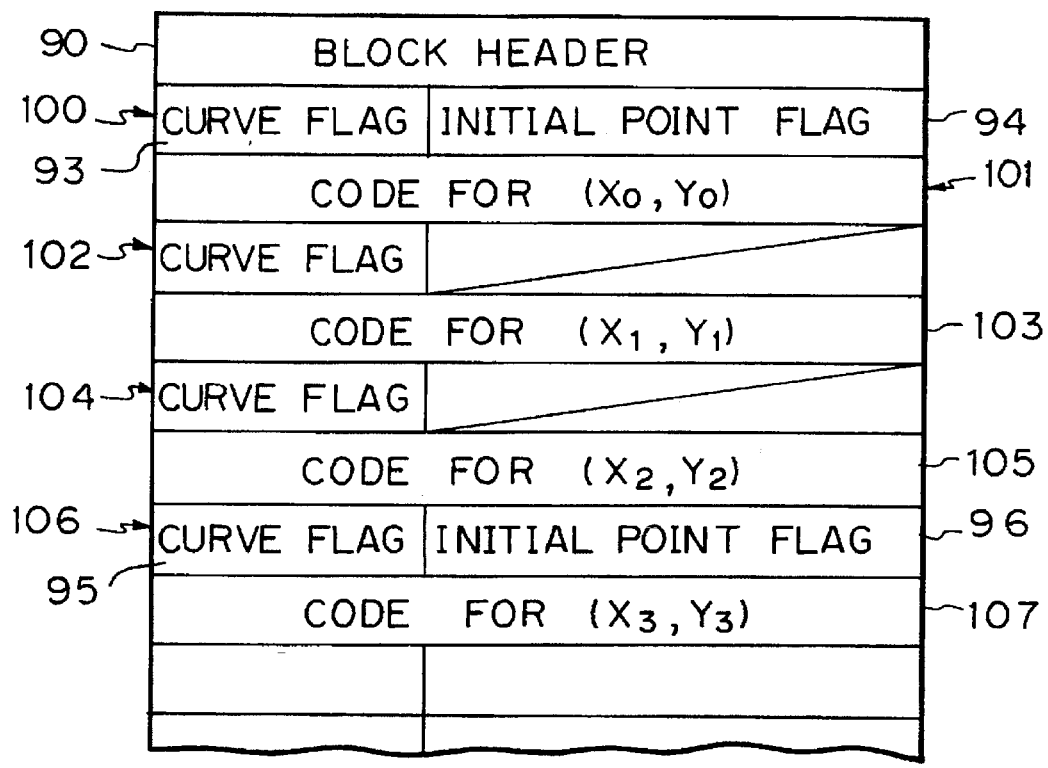
FIG. 20(B) is a diagram showing an example of contour information of the curve of FIG. 12.
Figure 22:
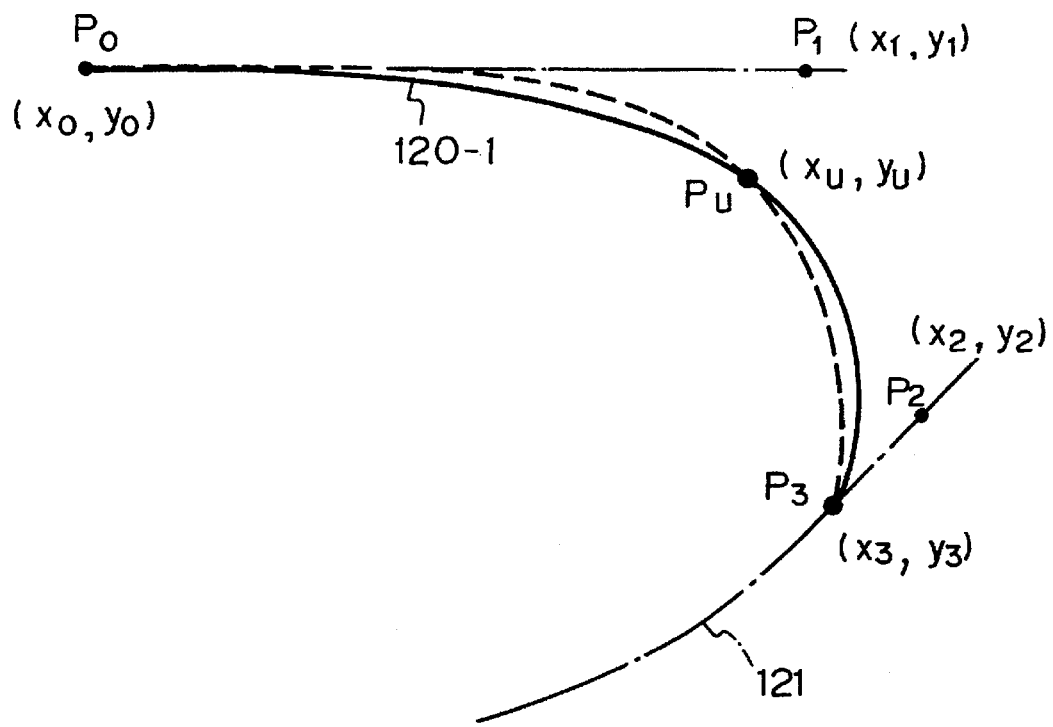
FIG. 22 is a diagram for explaining the case where a curve is encoded by approximating it by a Bézier curve.

FIG. 20(B) is a diagram showing the case where a curve 120-1 in FIG. 22 was encoded and recorded.

The number of samples of the curve 120-1 is set into the block header 90. The flag of the initial point $P_0$ of the curve 120-1 is set into the segment header 100. That is, the curve flag 93 and the initial point flag 94 are set to ON. The coded data of the coordinates ($x_0$, $y_0$) of the initial point $P_0$ are stored in the segment information 101. The coordinates of the special points $P_1$ and $P_2$ on the curve 120-1 are stored into the segment information 103 and 105, respectively. In the corresponding segment headers 102 and 104, only the curve flag is set to ON. On the other hand, since the terminative point $P_3$ of the curve 120-1 is also the initial point of a next curve 121, the curve flag and initial point flag in the segment header 106 are set to ON. The coded data of the coordinates $(x_3, y_3)$ are stored into the segment information 107.

Figure 21:
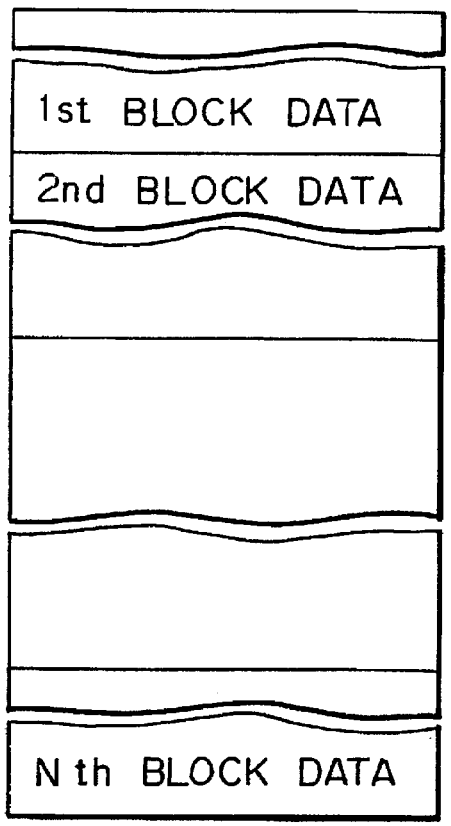
FIG. 21 is a diagram showing a format of block data.

Each of the coded block data based on the foregoing format is stored on each block unit basis as shown in FIG. 21.

The example regarding the character contour data compression has been described above. An explanation will now be made with respect to the case where the contour data compressed as mentioned above is decoded into the original contour data.

The segment header and segment information of the compression data stored as shown in FIG. 21 are read every block data. A straight line in which the straight line flag of the segment header is set to ON is reproduced by connecting the compound initial point and terminative point by a straight line. On the other hand, a curve in which the curve flag of the segment header is set to ON is derived by the equation $$P(t)=P_0(1-t)^3+3P_1t(1-t)^2+3P_2t^2(1-t)+P_3t^3$$

(where $0 \leq t \leq 1$)

on the basis of the decoded coordinates of four special points by using the foregoing Bézier curve. At this time, the curve can be expressed by sufficiently finely dissolving t in a range from "0" to "1" and by connecting each interval by straight lines.

The reconstructed contour data is developed by a dot pattern of the image data in the memory. A desired character or image is reconstructed by supplying the dot pattern to an output apparatus such as laser beam printer, CRT, or the like.

Although the method whereby a point is moved on an original curve has been used to correct an arbitrary input point in the embodiment, the correction can be also performed by fixing an arbitrary input point and changing the dissolving coefficient u in a range from "0" to "1". On the other hand, although the example of the contour of a character has been described in the embodiment, the invention can be also applied to diagram data.

As described above, according to the embodiment, there is an advantage such that the coding process of a contour line by a Bézier curve, which has conventionally been considered to be difficult, can be accurately performed at a high speed by designating the initial point, terminative point, and the other points on the contour line.

As described above, according to the invention, since the contour of the image data can be approximated into a curve at a high speed, there is an advantage such that the contour or diagram image of the image data of a character or the like can be easily encoded.

What is claimed is:

1. An image processing apparatus comprising:

first deriving means for deriving coordinates of two end points of a segment of a curve obtained from data of a contour of an image and slopes of the curve segment at the two end points;

second deriving means for deriving coordinates for specifying an approximate curve based on the coordinates of the two end points and the curve slopes derived by said first deriving means and coordinates of an intermediate point on the curve segment, and deriving the approximate curve based on the derived specifying coordinates and the coordinates of the two end points;

error deriving means for deriving an error between the curve segment and the approximate curve derived by said second deriving means;

deciding means for changing a position of the intermediate point between the two end points and causing said second deriving means and said error deriving means to repeat the approximate curve deriving and the error deriving in response to the changed position of the intermediate point and for deciding (a) the specifying coordinates derived by said second deriving means with the error derived by said error deriving means being the smallest and (b) the coordinates of the two end points as sample point data for representing the approximate curve; and memory means for storing the sample point data for representing the approximate curve decided by said deciding means.

2. An apparatus according to claim 1, wherein the approximate curve is a Bezier cubic curve.

3. An apparatus according to claim 1, further comprising second deciding means for deciding, in response to the error derived by said second deriving means, whether or not a further error should be derived by said second deriving means by changing one of the two end points of the segment to one end point of a next segment of the curve and by deriving a further approximate curve.

4. An apparatus according to claim 1, wherein said output means comprises a printer or a display device.

5. An image processing apparatus comprising:

first deriving means for deriving coordinates of two end points of a segment of a curve obtained from data of a contour of an image and slopes of the curve segment at the two end points;

second deriving means for deriving an error between the segment and an approximate curve determined based on coordinates of an intermediate point of the segment between the two end points and the coordinates of the two end points and the curve slopes derived by said first deriving means;

deciding means for deciding that a further error should be derived by said second deriving means by changing a position of the intermediate point in response to the error derived by said second deriving means being larger than a prescribed value and that data specifying the approximate curve should be used as compressed image data in response to the error derived by said second deriving means being smaller than the prescribed value;

memory means for storing the data specifying the approximate curve when said deciding means decides that the data specifying the approximate curve should be used as compressed data;

output means for outputting an image based on the data specifying the approximate curve stored in said memory means;

input means for inputting image data;

extracting means for extracting a contour of the image data input by said input means;

straight line approximation means for approximating the contour extracted by said extracting means using a straight line deviated less than an allowable amount from the contour; and discriminating means for discriminating between a straight portion and a curved portion in the contour on the basis of the length of the straight line used by said straight line approximation means.

6. An apparatus according to claim 5, wherein said input means comprises an image scanner.

7. An image processing apparatus comprising:

first deriving means for deriving coordinates of two end points of a segment of a curve obtained from data of a contour of an image and slopes of the curve segment at the two end points;

second deriving means for deriving coordinates for specifying an approximate curve based on the coordinates of the two end points and the curve slopes derived by said first deriving means and a coefficient used for determining weighting on an intermediate point on the curve segment between the two end points, and deriving the approximate curve based on the derived specifying coordinates and the coordinates of the two end points;

error deriving means for deriving an error between the curve segment and the approximate curve derived by said second deriving means;

deciding means for changing the coefficient and causing said second deriving means and said error deriving means to repeat the approximate curve deriving and the error deriving in response to the changed coefficient and for deciding (a) the specifying coordinates derived by said second deriving means with the error derived by said error deriving means being the smallest and (b) the coordinates of the two end points as sample point data for representing the approximate curve; and memory means for storing the sample point data for representing the approximate curve decided by said deciding means.

8. An apparatus according to claim 7, wherein the approximate curve is a Bezier cubic curve.

9. An apparatus according to claim 7, further comprising second deciding means for deciding, in response to the error derived by said second deriving means, whether or not a further error should be derived by said second deriving means by changing one of the two end points of the segment to one end point of a next segment of the curve and by deriving a further approximate curve.

10. An apparatus according to claim 7, wherein said output means comprises a printer or a display device.

11. An image processing apparatus comprising:

first deriving means for deriving coordinates of two end points of a segment of a curve obtained from data of a contour of an image and slopes of the curve segment at the two end points;

second deriving means for deriving an error between the segment and an approximate curve determined based on coordinates of an intermediate point on the segment between the two end points, the coordinates of the two end points and the curve slopes derived by said first deriving means and a prescribed coefficient;

deciding means for deciding that a further error should be derived by said second deriving means by changing the prescribed coefficient in response to the error derived by said second deriving means being larger than a prescribed value and that data specifying the approximate should be used as compressed image data in response to the error derived by said second deriving means being smaller than the prescribed value;

memory means for storing the data specifying the approximate curve when said deciding means decides that the data specifying the approximate curve should be used as compressed data;

output means for outputting an image based on the data specifying the approximate curve stored in said memory means input means for inputting image data;

extracting means for extracting a contour of the image data input by said input means;

straight line approximation means for approximating the contour extracted by said extracting means using a straight line deviated less than an allowable amount from the contour; and discriminating means for discriminating between a straight portion and a curved portion in the contour on the basis of the length of the straight line used by said straight line approximation means.

12. An apparatus according to claim 11, wherein said input means comprises an image scanner.

13. A method of obtaining and storing compressed images which approximate the images of input curves, comprising the steps of:

deriving coordinates of two end points of a segment of a curve obtained from data of a contour of an image and slopes of the curve segment at the two end points;

deriving coordinates for specifying an approximate curve based on the coordinates of the two end points and the derived curve slopes and coordinates of an intermediate point on the curve segment, and deriving the approximate curve based on the derived specifying coordinates and the coordinates of the two end points;

deriving an error between the curve segment and the derived approximate curve;

changing a position of the intermediate point between the two end points and causing repetition of the approximate curve deriving and the error deriving in response to the changed position of the intermediate point and deciding (a) the derived specifying coordinates with the derived error being the smallest and (b) the coordinates of the two end points as sample point data for representing the approximate curve; and storing the sample point data for representing the approximate curve decided in said deciding step.

14. The method according to claim 13, wherein the approximate curve is a Bezier cubic curve.

15. The method according to claim 13, further comprising the steps of:

deciding, in response to the derived error, whether or not a further error should be derived by changing one of the two end points of the segment to one end point of a next segment of the curve; and deriving a further approximate curve when the decision is made to derive a further error.

16. The method according to claim 13, further comprising the steps of:

inputting image data; and extracting the contour of the inputted image data;

approximating the contour using a straight line deviated less than an allowable amount from the contour; and discriminating between a straight portion and a curved portion in the contour on the basis of the length of the straight line.

17. A method of obtaining and storing compressed images which approximate the images of input curves comprising the steps of:

deriving coordinates of two end points of a segment of a curve obtained from data of a contour of an image and slopes of the curve segment at the two end points;

deriving coordinates for specifying an approximate curve based on the coordinates of the two end points and the derived curve slopes and a coefficient used for determining weighting on an intermediate point on the curve segment between the two end points, and deriving the approximate curve based on the derived specifying coordinates and the coordinates of the two end points;

deriving an error between the curve segment and the derived approximate curve;

changing the coefficient and causing repetition of the approximate curve deriving and the error deriving in response to the changed coefficient and for deciding (a) the derived specifying coordinates with the derived error being the smallest and (b) the coordinates of the two end points as sample point data for representing the approximate curve; and storing the sample point data for representing the approximate curve.

18. The method according to claim 17, wherein the approximate curve is a Bezier cubic curve.

19. The method according to claim 17, further comprising the steps of:

deciding, in response to the derived error, whether or not a further error should be derived by changing one of the two end points of the segment to one end point of a next segment of the curve; and deriving a further approximate curve when the decision is made to derive a further error.

20. The method according to claim 7, further comprising the steps of:

inputting image data;

extracting the contour of the inputted image data;

approximating the contour using a straight line deviated less than an allowable amount from the contour; and discriminating between a straight portion and a curved portion in the contour on the basis of the length of the straight line.

21. An apparatus according to claim 1, further comprising means for outputting the sample point data stored in said memory means.

22. An apparatus according to claim 7, further comprising means for outputting the sample point data stored in said memory means.

23. A method according to claim 13, further comprising the step of outputting the sample point data stored in said storing step.

24. A method according to claim 17, further comprising the step of outputting the sample point data stored in said storing step.

* * * * *

UNITED STATES PATENT AND TRADEMARK OFFICE
CERTIFICATE OF CORRECTION

PATENT NO. : 5,644,654

DATED : July 1, 1997

INVENTOR(S) : KEN ONODERA

It is certified that error appears in the above-identified patent and that said Letters Patent is hereby corrected as shown below:

<u>ON TITLE PAGE AT [63] RELATED U.S. APPLICATION DATA</u>

"Continuation-in-part" should read --Continuation--.

<u>ON TITLE PAGE AT [19] UNITED STATES PATENT</u>

"Onokera" should read --Onodera--.

<u>ON TITLE PAGE AT [75] INVENTOR</u>

"Ken Onokera" should read --Ken Onodera--.

<u>SHEET 6</u>

Fig. 11, "10-1" should --101--.

<u>COLUMN 1</u>

Line 34, "open" should read --Open--.

<u>COLUMN 4</u>

Line 3, "point 40" should read --point 40,--;
Line 4, "point 40," should read --point 40--;
Line 20, "$m_o'$" should read --$m_o,$--;
Line 24, "$(x_2, y_2).$" should read --$(x_2, y_2)$:--

UNITED STATES PATENT AND TRADEMARK OFFICE
CERTIFICATE OF CORRECTION

PATENT NO. : 5,644,654

DATED : July 1, 1997

INVENTOR(S) : KEN ONODERA

It is certified that error appears in the above-identified patent and that said Letters Patent is hereby corrected as shown below:

COLUMN 5

Line 21, "$P_1(x_1,y_1,$" should read --$P_1(x_1,y_1)$,--
  Line 31, "B" should read --Bézier--;
  Line 32, "ézier" should be deleted.

COLUMN 6

Line 19, "equation" should read --equation:--.

COLUMN 7

Line 11, "Bezier" should read --Bézier--;
  Line 13, "B" should read --Bézier--;
  Line 14, "ézier" should be deleted;
  Line 59, "B" should read --Bézier--;
  Line 60, "ézier" should be deleted;
  Line 66, "section 10-1" should read --section 101--.

COLUMN 9

Line 51, "(where," should read --(where--;
  Line 58, "an enough small" should --a small enough--.

COLUMN 10

Line 2, "B" should read --Bézier--;
  Line 3, "ézier" should be deleted;
  Line 19, "B" should read --Bézier--;
  Line 20, "ézier" should be deleted.

UNITED STATES PATENT AND TRADEMARK OFFICE
CERTIFICATE OF CORRECTION

PATENT NO. : 5,644,654

DATED : July 1, 1997

INVENTOR(S): KEN ONODERA

It is certified that error appears in the above-identified patent and that said Letters Patent is hereby corrected as shown below:

COLUMN 13

Line 65, "should" should read --curve should--.

COLUMN 14

Line 7, "means input" should read --means; ¶ input--;
Line 57, "and" should be deleted.

COLUMN 16

Line 5, "claim 7," should read --claim 17,--.

Signed and Sealed this

Thirty-first Day of March, 1998

Attest:

BRUCE LEHMAN

Attesting Officer

Commissioner of Patents and Trademarks